United States Patent
Zeng et al.

(10) Patent No.: US 7,795,852 B2
(45) Date of Patent: Sep. 14, 2010

(54) APPARATUS AND METHOD FOR ADJUSTING WORKING FREQUENCY OF VOLTAGE REGULATOR DOWN CIRCUIT (VRD) BY DETECTING CURRENT

(75) Inventors: Li Zeng, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 474 days.

(21) Appl. No.: 12/017,618

(22) Filed: Jan. 22, 2008

(65) Prior Publication Data

US 2009/0134857 A1   May 28, 2009

(30) Foreign Application Priority Data

Nov. 22, 2007   (TW) .............................. 96144299 A

(51) Int. Cl.
*G05F 1/56* (2006.01)
(52) U.S. Cl. ..................................................... 323/282
(58) Field of Classification Search .................. 323/282
See application file for complete search history.

(56) References Cited

U.S. PATENT DOCUMENTS

| | | | | |
|---|---|---|---|---|
| 5,768,111 A * | 6/1998 | Zaitsu | .......................... | 363/15 |
| 6,441,597 B1 * | 8/2002 | Lethellier | ..................... | 323/282 |
| 6,979,985 B2 * | 12/2005 | Yoshida et al. | ............... | 323/282 |
| 7,692,935 B2 * | 4/2010 | Yamauchi et al. | .............. | 363/16 |
| 2008/0180075 A1 * | 7/2008 | Xie et al. | ..................... | 323/282 |
| 2009/0134857 A1 * | 5/2009 | Zeng et al. | ................... | 323/282 |
| 2009/0303750 A1 * | 12/2009 | Zhu et al. | ...................... | 363/13 |
| 2010/0134079 A1 * | 6/2010 | Liu et al. | ..................... | 323/282 |

FOREIGN PATENT DOCUMENTS

TW    509832    11/2002

* cited by examiner

*Primary Examiner*—Jeffrey L Sterrett
(74) *Attorney, Agent, or Firm*—J.C. Patents

(57) ABSTRACT

The present invention provides an apparatus for adjusting a working frequency of a VRD. The apparatus includes a current detecting circuit, a variable resistance module, and a controller. The current detecting circuit is adapted for determining an output load state of the VRD by detecting a value of a current outputting from the VRD, and outputting a control signal for adjusting the working frequency of the VRD according to the output load state of the VRD. The variable resistance module is coupled to the VRD, and is adapted for providing an external resistor to the VRD. The controller is coupled to the current detecting circuit, and is adapted for receiving the control signal, and adjusting a resistance of the variable resistance module, so as to adjust the working frequency of the VRD.

12 Claims, 5 Drawing Sheets

APPARATUS AND METHOD FOR ADJUSTING WORKING FREQUENCY OF VOLTAGE REGULATOR DOWN CIRCUIT (VRD) BY DETECTING CURRENT

CROSS-REFERENCE TO RELATED APPLICATION

This application claims the priority benefit of Taiwan application serial no. 96144299, filed on Nov. 22, 2007. The entirety of the above-mentioned patent application is hereby incorporated by reference herein and made a part of this specification.

BACKGROUND OF THE INVENTION

1. Field of the Invention

The present invention generally relates to a power supply technology, and more particularly, to a power supply technology for reducing the depletion of the power supply equipment.

2. Description of Related Art

With the development of electronic information technology, many portable apparatus with the battery such as cell phone, laptop should meet the demand of converting a battery voltage into an operation voltage. As a basic voltage regulating circuits employed in ordinary power suppliers, more and more voltage regulator down circuit (VRD) modules are used in a variety of electronic products.

Typically in a computer, a VRD is often used as a power supplier for a CPU. However, a conventional VRD usually adopts a fixed frequency. Therefore, when it is introduced in the computer, regardless whether the CPU is working in the state of a light load or a heavy load, the frequency of the VRD module remains unchanged. The VRD module thus often depletes considerably and results in power wastage.

In the present era when the environmental protection is increasingly given importance, it is commonplace to effectively use the inadequate or limited power supply. At present, with the increasing strict requirement of power consumption of electronic products, many developed countries have made standards and regulations towards standby power consumption. Therefore, many new technologies are developed in order to meet the newly issued standards, which allow the switching power supply to work with a lower switching frequency when the electronic product works in a state of a light load or standby.

Taiwan patent No. TW00509832 discloses a power conversion unit which outputs a direct current (DC) controlled by a pulse signal via a pulse width modulator (PWM) unit. The power conversion unit further includes a calculation unit for detecting the current output, and determines a calculation mode of a load according to a value of the detected current output. When the current output is faded, a value smaller than usual value is read to a periodical recorder, the PWM generates the pulse signal according to the value recorded in the periodical recorder and the calculation unit.

Taiwan patent No. TW00509832 discloses that the calculation unit detects the current output, and thus determines the calculation mode of the load, and then adjusts the pulse signal. This provides a solution for the problem of CPU consuming too much power. However, it fails to provide a solution for the problem of the VRD module consuming too much power. Furthermore, the aforesaid device requires hardware such as calculation unit, micro controller unit (MCU) with high cost and a relatively complicated detection process.

SUMMARY OF THE INVENTION

Accordingly, the present invention is directed to an apparatus for adjusting a working frequency of a VRD by detecting current, which can provide a relatively easy detecting process with low cost.

The present invention is also directed to a method for adjusting a working frequency of a VRD by detecting current. The method is adapted to lower a working frequency of a VRD when the VRD is working for a light load, and raise the working frequency of the VRD when the VRD is working for a heavy load.

The present invention provides an apparatus for adjusting a working frequency of a VRD by detecting current. The apparatus includes a current detecting circuit, a variable resistance module, and a controller. The current detecting circuit is adapted for determining an output load state of the VRD by detecting a value of a current outputting from the VRD, and outputting a control signal for adjusting the working frequency of the VRD according to the output load state of the VRD. The variable resistance module is coupled to the VRD, and is adapted for providing an external resistor to the VRD. The controller is coupled to the current detecting circuit and the variable resistance module, and is adapted for receiving the control signal, and adjusting a resistance of the variable resistance module, so as to adjust the working frequency of the VRD.

According to an embodiment of the present invention, the current detecting circuit includes an inductor, a capacitor, a current detecting resistor, and an error amplifier. The inductor is disposed in a voltage stabilizing circuit of the VRD and coupled to an output terminal of the VRD, and is adapted for detecting current flowing therethrough when the VRD is supplying power to a CPU. The capacitor is serially connected to the current detecting resistor. The capacitor and the current detecting resistor are coupled to the inductor in parallel for obtaining a detecting voltage corresponding to the detecting current. The error amplifier includes a first input terminal, a second input terminal, and an output terminal. The first input terminal, the second input terminal are coupled to the capacitor for amplifying the detecting voltage.

According to an embodiment of the invention, the variable resistance module includes a first oscillating resistor, and a second oscillating resistor. The controller is a switch. The switch is serially connected to the first oscillating resistor, and the switch is coupled to the current detecting circuit for switching between a conducting state and a disconnecting state according to the control signal. The second oscillating resistor is coupled to the first oscillating resistor and the switch in parallel.

According to an embodiment of the invention, the switch comprises a transistor including a first source/drain, a second source/drain, and a gate. The first source/drain is coupled to the first oscillating resistor, the second source/drain is coupled to a ground voltage, and the gate is coupled to the current detecting circuit for switching between a conducting state and a disconnecting state according to the control signal.

According to an embodiment of the present invention, there is a predetermined correlation between the working frequency of the VRD and a resistance of an oscillating resistor composed of the first oscillating resistor and the second oscillating resistor. The resistance of the oscillating resistor comprises a resistance of the second oscillating resistor or a resistance of the first oscillating resistor and the second oscillating resistor connected in parallel.

The present invention provides an apparatus for adjusting a working frequency of a VRD by detecting current. The apparatus includes a current detecting module, and a variable resistance module. The current detecting circuit is adapted for determining an output load state of the VRD by detecting a value of a current outputting from the VRD, and outputting a control signal for adjusting the working frequency of the VRD according to the output load state of the VRD. The variable resistance module is coupled to the VRD and the current detecting circuit for adjusting a resistance of the variable resistance module, and thus adjusting the working frequency of the VRD.

According to an embodiment of the present invention, the variable resistance module comprises a potentiometer.

The present invention provides a method for adjusting a VRD by detecting current for detecting whether a CPU working at a heavy load state or a light load state. When the CPU is working at the light load state, a working frequency of the VRD which supplies power to the CPU is reduced. The method includes coupling a variable resistance module to the VRD, detecting a current outputting from the VRD, determining the output load state of the VRD according to the detected current, and adjusting a resistance of the variable resistance module according to the output load state, so as to adjust the working frequency of the VRD.

The present invention provides an apparatus and a method for adjusting a working frequency of a VRD by detecting current, and is capable of determining a CPU working at a heavy load or a light load by detecting a current outputted from the VRD which supplies power to the CPU. Thus, the working frequency of the VRD may be determined according to the load state of the CPU, the power consumption of the VRD may be controlled, and unnecessary power consumption may be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
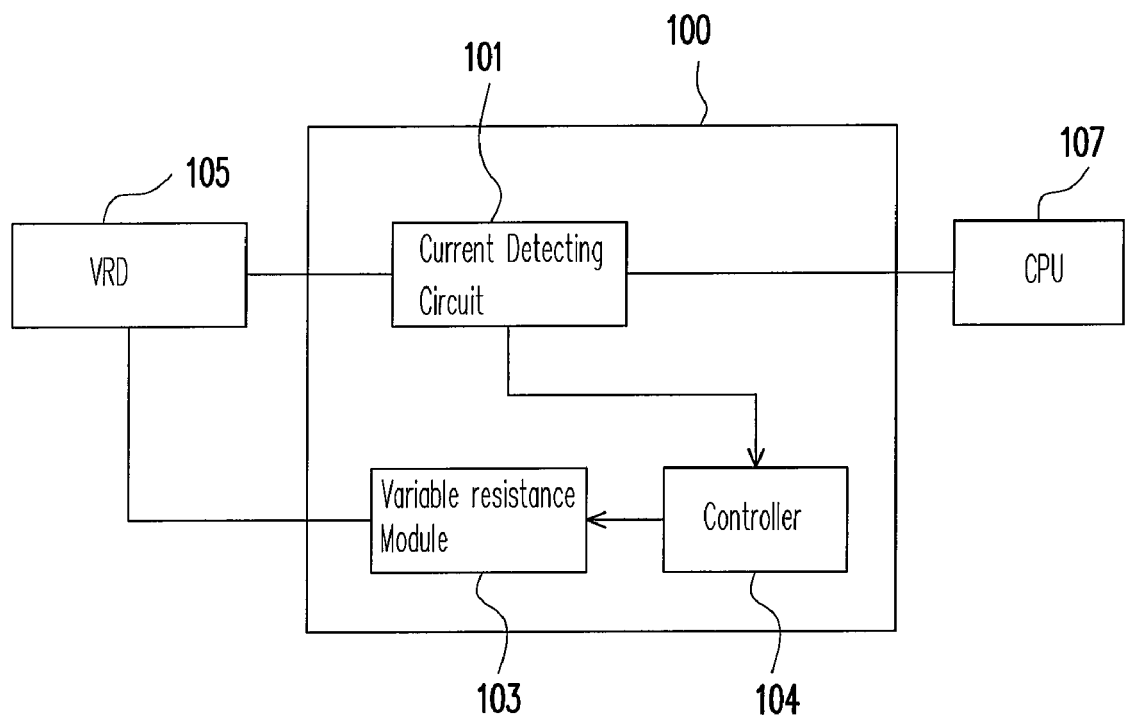
FIG. 1 is a structural block diagram illustrating an apparatus for adjusting a working frequency of a VRD by detecting current according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention is characterized by detecting a current output from a VRD to determine whether a CPU is working at a heavy load or a light load, and thus controlling a power consumption of the VRD by adjusting a resistance to change the working frequency of the VRD.

Referring to FIG. 1, there is shown a schematic structural diagram illustrating an apparatus 100 for adjusting a working frequency of a VRD 105 by detecting current according to an embodiment of the present invention. The apparatus 100 is adapted for detecting a load state of a CPU 107 by detecting an output current from the VRD 105 which is used for supplying power to the CPU 107. The apparatus 100 includes a current detecting circuit 101, a variable resistance module 103, and a controller 104. The current detecting circuit 101 is adapted for determining the load state of the CPU 107 by detecting a value of the current outputting from the VRD 105, and outputting a control signal for adjusting the working frequency of the VRD 105 via the value of the current. The variable resistance module 103 is coupled to the VRD 105, and is adapted for providing an external resistor for the VRD 105. The controller 104 is coupled to the current detecting circuit 101 and the variable resistance module 103 for receiving the control signal, and adjusting a resistance of the variable resistance module 103, so as to adjust the working frequency of the VRD 105.

Figure 2:
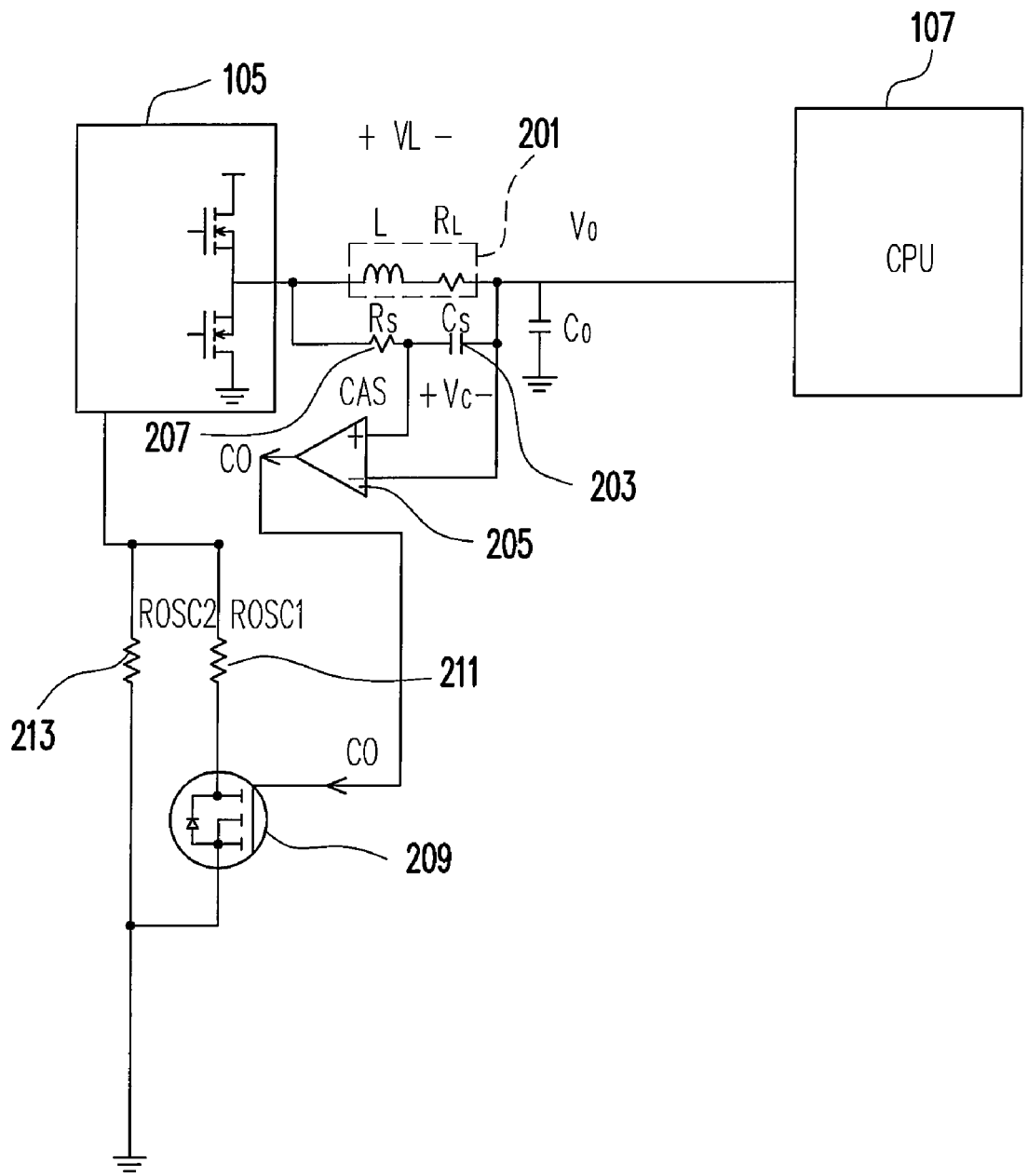
FIG. 2 is a schematic diagram illustrating an apparatus for adjusting a working frequency of a VRD by detecting current according to an embodiment of the present invention.

FIG. 2 is a schematic diagram illustrating an apparatus for adjusting a working frequency of a VRD by detecting current according to an embodiment of the present invention. Referring to FIGS. 1 and 2, the current detecting circuit 101 includes an inductor 201, a capacitor 203, an error amplifier 205, and a current detecting resistor 207. The inductor 201 is disposed in a voltage stabilizing circuit of the VRD 105, and is coupled to an output terminal of the VRD 105 for allowing a detecting current to flow therethrough when the VRD 105 is providing power to the CPU. The capacitor 203 is serially connected to the current detecting resistor 207. The serially connected capacitor 203 and the current detecting resistor 207 are coupled to the inductor 201 in parallel for obtaining a detecting voltage corresponding to a detecting current. The error amplifier 205 includes a first input terminal, a second input terminal, and an output terminal. The first input terminal, the second input terminal are coupled to the capacitor 203 for amplifying the detecting voltage. The error amplifier 205 is adapted to amplify the detecting voltage to a desired value by presetting a certain value (amplifying rate).

The variable resistance module 103 is coupled to the VRD 105 for providing an external resistor to the VRD 105. The controller 104 is coupled to the current detecting circuit 101 and the variable resistance module 103 for receiving the control signal, and for adjusting a resistance of the variable resistance module 103 according to the control signal. Thus, the working frequency of the VRD 105 may be adjusted. The variable resistance module 103 includes a first oscillating resistor 211, and a second oscillating resistor 213. The controller 104, according to an aspect of the embodiment, for example is a transistor 209. The transistor 209 includes a first source/drain, a second source/drain, and a gate. The first source/drain is coupled to the first oscillating resistor 211. The second source/drain is coupled to a ground voltage. The gate is coupled to the output terminal of the error amplifier 205 of the current detecting circuit 101. The first oscillating resistor 211 is serially connected to the transistor 209. The second oscillating resistor 213 is connected to the first oscillating resistor 211 and the transistor 209 in parallel. The transistor 209 is adapted for receiving the amplified detecting voltage outputted from the current detecting circuit 101, and for switching to a conducting or disconnecting state according to the amplified detecting voltage. In such a way, a current state of the CPU is determined according to a value of the current detected by the current detecting circuit 101, and thereby whether the first oscillating resistor 211 and the second oscillating resistor are remained parallel connected or not is determined.

Figure 3:
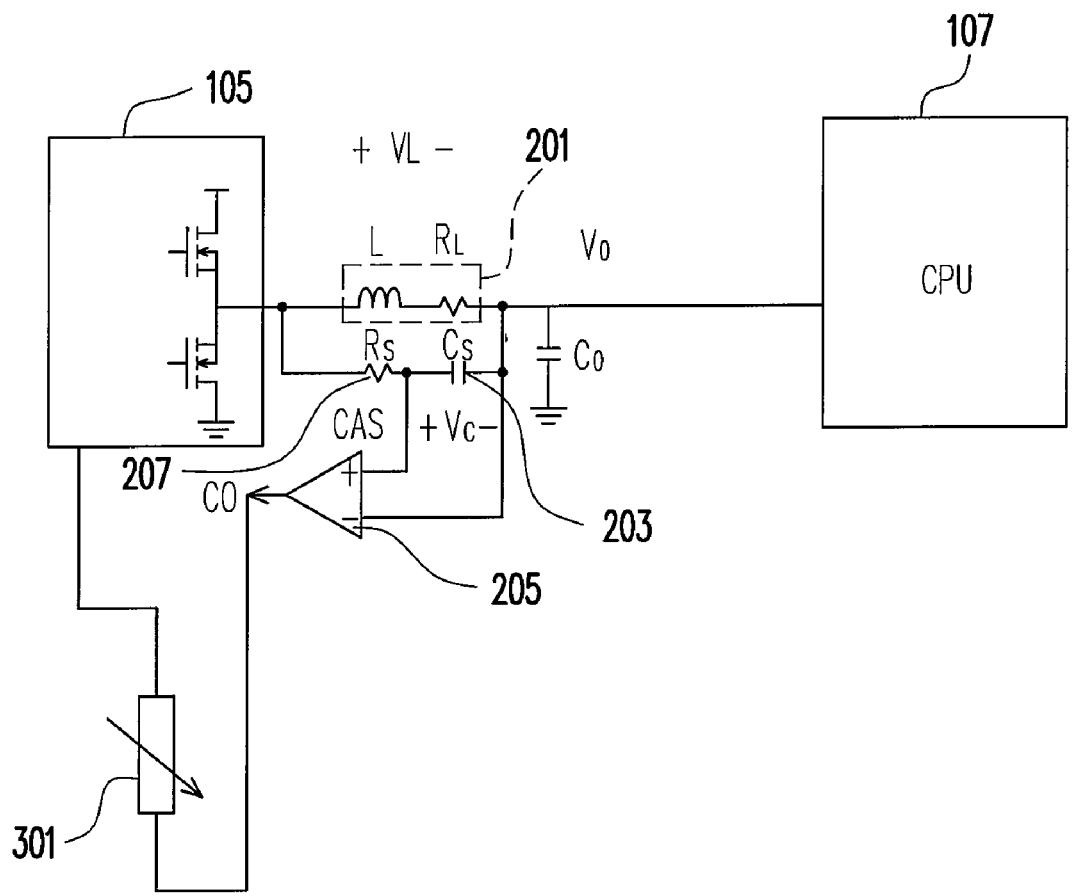
FIG. 3 is a schematic structural diagram illustrating an apparatus for adjusting a working frequency of a VRD by detecting current according to another embodiment of the present invention.

Referring to FIG. 3, there is shown a schematic structural diagram illustrating another apparatus for adjusting a working frequency of a VRD 105 by detecting current according to an embodiment of the present invention. The apparatus includes a current detecting circuit 101, and the variable resistance module 301. The current detecting circuit 101 is adapted for determining the load state of the CPU 107 by detecting a value of the current outputting from the VRD 105, and outputting a control signal for adjusting the working frequency of the VRD 105. The variable resistance module 301 is coupled to the VRD 105 and the current detecting circuit 101 for adjusting resistance thereof according to the control signal. The current detecting circuit 101 is identical to the current detecting circuit 101 as shown in FIG. 2, and is not iterated hereby. According to an aspect of the embodiment, the variable resistance module 301 is, for example, a potentiometer.

Figure 4:
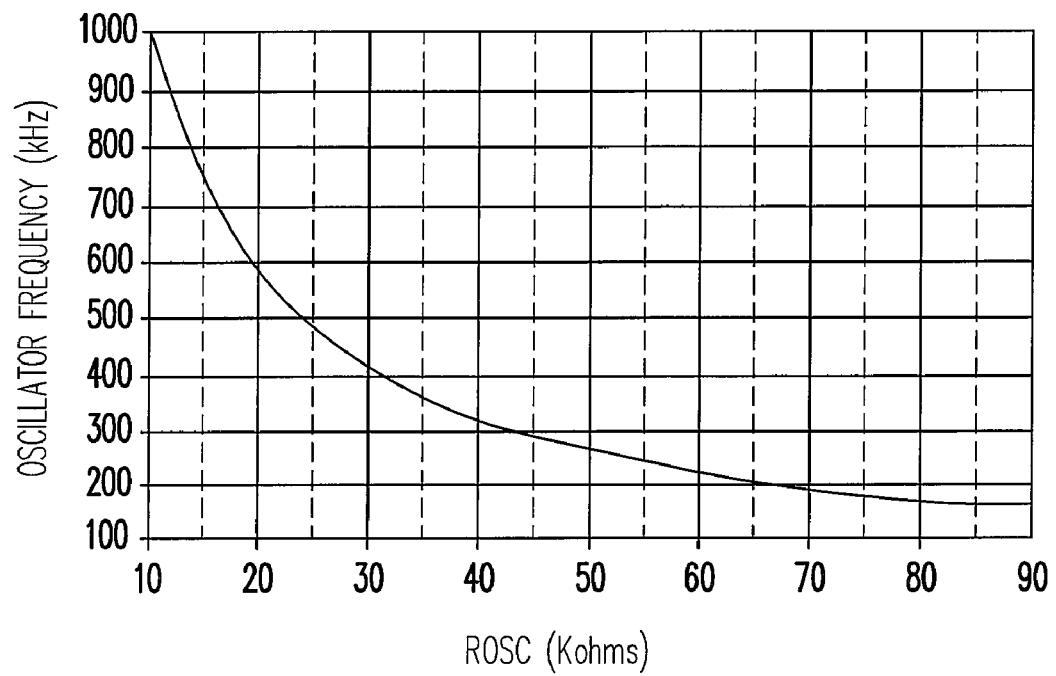
FIG. 4 is a diagram illustrating a correlation between a resistance of an oscillation resistor and a working frequency.

Referring to FIG. 4, there is shown a diagram illustrating a correlation between resistance of an oscillation resistor and a working frequency. It can be learnt from FIG. 4 that when the detecting voltage outputted from the error amplifier 205 is sufficient for conducting the transistor, the transistor 209 is conducted, and the first oscillating resistor 211 and the second oscillating resistor 213 are connected in parallel. Therefore, a resistance of the oscillating resistor is the resistance of the first oscillating resistor 211 and second oscillating resistor 213 connected in parallel. When it is detected that the voltage outputted from the error amplifier 205 is insufficient for conducting the transistor, the transistor 209 remains in off state, and the first oscillating resistor 211 and the second oscillating resistor 213 are disconnected. Therefore, the resistance of the oscillating resistor is the resistance of the second oscillating resistor 213. The resistance of the first oscillating resistor 211 and the second oscillating resistor 213 connected in parallel is less than the resistance of any one of them. Therefore, as shown in FIG. 4, a low resistance of the oscillating resistor corresponds to a higher working frequency, and the working frequency decreases as the resistance increases. Since the working frequency is directly proportional to the power consumption, the power consumption can be adjusted by adjusting the resistance of the oscillating resistor. When the CPU is working in a light load mode, it is preferable to only connect the second oscillating resistor to increase the resistance of the oscillating resistor and therefore, the working frequency is correspondingly lower. In such a way, less power is consumed.

However, it should be noted that the selection of the inductor and the capacitor is to some degree correlated to the frequency (switching frequency). When determining the working frequency in the light load state, a low limitation of the working frequency under which the inductor and the capacitor are operated should be considered. Furthermore, the voltage wave should also satisfy a core voltage of the CPU.

Figure 5:
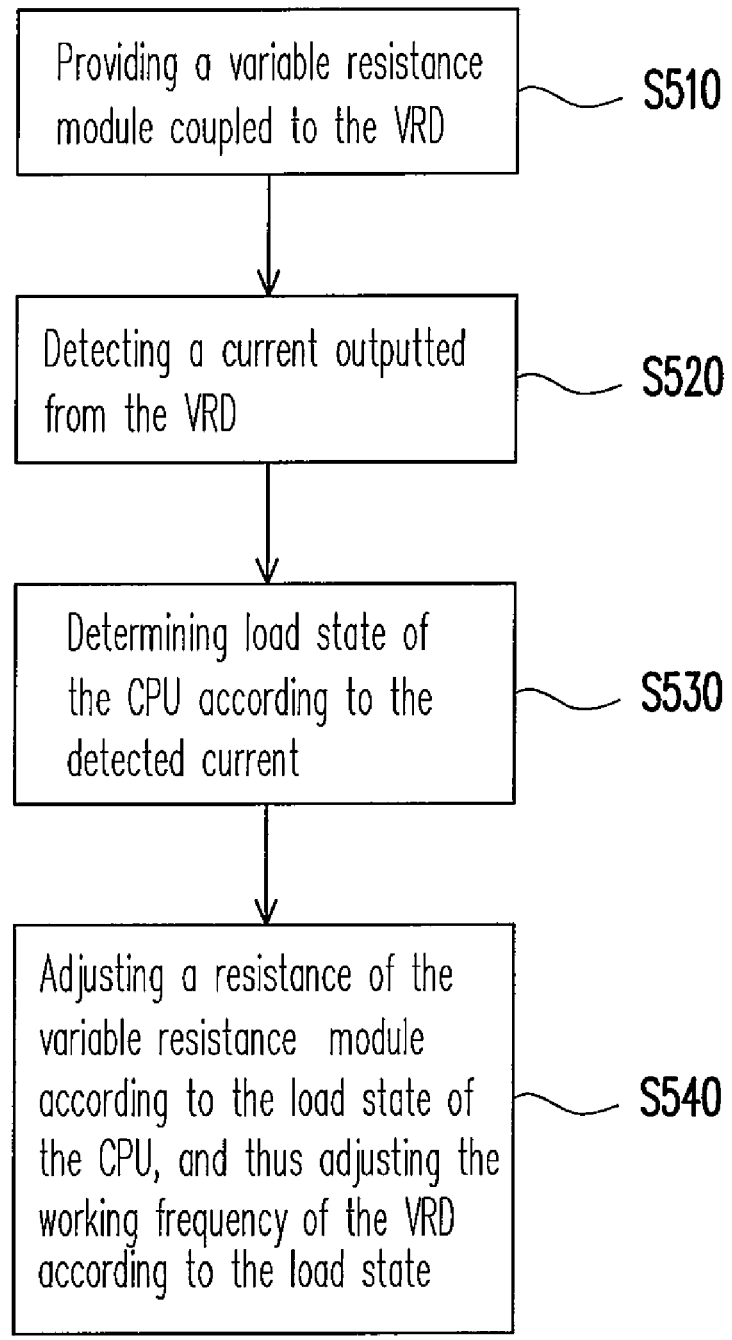
FIG. 5 is a flow chart illustrating a method for adjusting a working frequency of a VRD by detecting current according to an embodiment of the present invention.

Referring to FIG. 5, there is shown a flow chart illustrating a method for adjusting a working frequency of a VRD by detecting current in details according to an embodiment of the present invention. The method is adapted for detecting a load state of a CPU by detecting a current outputted from a VRD which is used for supplying power to the CPU, and thus adjusting a working frequency of the VRD. The method includes the following steps:

S510: providing a variable resistance module coupled to the VRD;

S520: detecting a current outputted from the VRD, wherein a current flows through an inductor of a stabilizing circuit of the VRD;

S530: determining a load state of the CPU (an output load state of the VRD) according to the detected current, wherein the current is converted into a voltage using a capacitor coupled to the inductor in parallel, and the converted voltage is compared with a preset voltage threshold range, and the load state of the CPU (the output load state of the VRD) is determined according to the comparison result; and S540: adjusting a resistance of the variable resistance module according to the load state of the CPU (the output load state of the VRD), and thus adjusting the working frequency of the VRD according to the load state, wherein the variable resistance module includes a first oscillating resistor and a second oscillating resistor; the controller is a transistor; and the first oscillating resistor is serially connected to the transistor, and is determined to alternatively connected in parallel with the second oscillating resistor or not by controlling a conducting/disconnecting state of the transistor.

In summary, the present invention provides an apparatus for adjusting a working frequency of a VRD by detecting current. The apparatus employs external resistor for adjusting the working frequency of the VRD when the CPU is working at different load states. When the CPU works in a light load state, the VRD works with a lower working frequency in order to decrease the power consumption thereof. Furthermore, the present invention employs a current detecting circuit for detecting a current outputted from the VRD so as to detect the current load state of the CPU. The detection process is simple and accurate, and the structure of the apparatus is simple.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for adjusting a working frequency of a voltage regulation down circuit (VRD), comprising:

a current detecting circuit, for determining an output load state of the VRD by detecting a value of a current output from the VRD, and outputting a control signal for adjusting the working frequency of the VRD according to the output load state of the VRD;

a variable resistance module, coupled to the VRD, for providing an external resistor to the VRD; and a controller, coupled to the current detecting circuit and the variable resistance module, for receiving the control signal, and adjusting a resistance of the variable resistance module to adjust the working frequency of the VRD.

2. The apparatus according to claim 1, wherein the current detecting circuit comprises:

an inductor, disposed in a voltage stabilizing circuit of the VRD, coupled to an output terminal of the VRD, for detecting current flowing therethrough when the VRD is supplying power to a CPU;

a current detecting resistor;

a capacitor, connected to the current detecting resistor in series, wherein the capacitor and the current detecting resistor are coupled in parallel to the inductor, for obtaining a detecting voltage corresponding to the detecting current; and an error amplifier having a first input terminal, a second input terminal, and an output terminal, wherein the first input terminal and the second input terminal are coupled to the capacitor for amplifying the detecting voltage and generating the control signal.

3. The apparatus according to claim 1, wherein the variable resistance module comprises a first oscillating resistor, and a second oscillating resistor, wherein the controller is a switch serially connected to the first oscillating resistor, and is coupled to the current detecting circuit for switching between a conducting state and a disconnecting state according to the control signal, the second oscillating resistor are coupled in parallel to the first oscillating resistor and the switch.

4. The apparatus according to claim 3, wherein the switch is a transistor having a first source/drain, a second source/drain, and a gate, wherein the first source/drain is coupled to the first oscillating resistor; the second source/drain is coupled to a ground voltage; and the gate is coupled to the current detecting circuit for switching between a conducting state and a disconnecting state according to the control signal.

5. The apparatus according to claim 3, wherein a predetermined correlation is set between the working frequency of the VRD and a resistance of an oscillating resistor composed of the first oscillating resistor and the second oscillating resistor.

6. The apparatus according to claim 5, wherein the resistance of the oscillating resistor is a resistance of the second oscillating resistor or a resistance of the first oscillating resistor and the second oscillating resistor connected in parallel.

7. An apparatus for adjusting a working frequency of a VRD, comprising:

a current detecting circuit, for determining an output load state of the VRD by detecting a value of a current output from the VRD, and outputting a control signal for adjusting a working frequency of the VRD according to the output load state of the VRD; and a variable resistance module, coupled to the VRD and the current detecting circuit, for adjusting a resistance of the variable resistance module to adjust the working frequency of the VRD.

8. The apparatus according to claim 7, wherein the variable resistance module comprises a potentiometer.

9. The apparatus according to claim 7, wherein the current detecting circuit comprises:

an inductor, disposed in a voltage stabilizing circuit of the VRD, coupled to an output terminal of the VRD, for detecting current flowing therethrough when the VRD is supplying power to a CPU;

a current detecting resistor;

a capacitor, connected in series to the current detecting resistor, wherein the capacitor and the current detecting resistor are coupled in parallel to the inductor, for obtaining a detecting voltage corresponding to the detecting current; and an error amplifier having a first input terminal, a second input terminal, and an output terminal, wherein the first input terminal, the second input terminal are coupled to the capacitor for amplifying the detecting voltage and generating the control signal.

10. A method for adjusting a VRD, comprising:

providing a variable resistance module coupled to the VRD;

detecting a current output from the VRD;

determining an output load state of the VRD according to the detected current; and adjusting a resistance of the variable resistance module according to the output load state of the VRD to adjust a working frequency of the VRD according to the load state.

11. The method according to claim 10, wherein the variable resistance module comprises a first oscillating resistor, a second oscillating resistor connected to the first oscillating resistor in parallel, wherein the parallel connected first oscillating resistor and second oscillating resistor are connected to the VRD, and wherein the step of adjusting a resistance of the variable resistance module comprises:

providing a switch connected in series to the first oscillating resistor; and conducting or disconnecting the switch according to the load state.

12. The method according to claim 11, wherein the step of adjusting a resistance of the variable resistance module comprises:

detecting the current output from the VRD, and converting the current into a voltage, and comparing the converted voltage with a preset voltage threshold;

generating a control signal for lowering the working frequency of the VRD when the preset voltage threshold is exceeded; and disconnecting the switch after receiving of the control signal.

* * * * *